(12) United States Patent
Wiater (10) Patent No.: US 9,899,108 B2
(45) Date of Patent: Feb. 20, 2018

(54) CAPILLARY CONNECTION THROUGH WALL PENETRATION

(71) Applicant: Rosemount Inc., Shakopee, MN (US)

(72) Inventor: Nathan Len Wiater, Victoria, MN (US)

(73) Assignee: Rosemount Inc., Shakopee, MN (US)

(*) Notice: Subject to any disclaimer, the term of this patent is extended or adjusted under 35 U.S.C. 154(b) by 298 days.

(21) Appl. No.: 14/672,681

(22) Filed: Mar. 30, 2015

(65) Prior Publication Data

US 2016/0290533 A1    Oct. 6, 2016

(51) Int. Cl.
| | | |
|---|---|---|
| *G21C 17/00* | (2006.01) |
| *G01L 19/00* | (2006.01) |
| *F16L 5/10* | (2006.01) |
| *G21C 13/036* | (2006.01) |
| *G21D 1/04* | (2006.01) |

(52) U.S. Cl.
CPC .............. *G21C 17/00* (2013.01); *F16L 5/10* (2013.01); *G01L 19/0046* (2013.01); *G21C 13/036* (2013.01); *F17C 2250/043* (2013.01); *G21D 1/04* (2013.01); *Y02E 30/40* (2013.01)

(58) Field of Classification Search
CPC ... G21C 13/036; G21C 17/00; G01L 19/0046; G01L 19/0084; G01L 19/0645; F17C 2250/043; F16L 5/10
See application file for complete search history.

(56) References Cited

U.S. PATENT DOCUMENTS

| | | |
|---|---|---|
| 2,203,357 A | 6/1940 | Kerr |
| 2,871,881 A | 2/1959 | Hewson |
| 3,509,904 A | 5/1970 | Olson |
| 4,082,324 A | 4/1978 | Obrecht |
| 4,319,492 A | 3/1982 | Hewson |
| 4,356,147 A | 10/1982 | Borrman et al. |
| 4,722,228 A * | 2/1988 | Awa ..................... G01F 23/164 73/301 |
| RE34,610 E | 5/1994 | Miller et al. |

(Continued)

FOREIGN PATENT DOCUMENTS

| | | |
|---|---|---|
| EP | 1 898 187 | 12/2008 |
| FR | 2727560 A1 | 5/1996 |
| FR | 2 794 778 | 12/2000 |

(Continued)

OTHER PUBLICATIONS

Kang Lin et al: "Pressure sensing line diagnostics in nuclear power plants 97 X Pressure sensing line diagnostics in nuclear power plants",, Jun. 26, 2012 (21012-06-26), XP0552979726, Retrieved from the Internet: URL:http://cdn.intechopen.com/pdfs/11567/InTech-Pressure sensing line diagnostics in nuclear power plants. pdf [retrieved on Jun. 10, 2016].*

(Continued)

*Primary Examiner* — Peter Macchiarolo
*Assistant Examiner* — Nathaniel Kolb
(74) *Attorney, Agent, or Firm* — Westman, Champlin & Koehler, P.A.

(57) ABSTRACT

A remote seal connection includes an outer sleeve, configured to be inserted through a penetration in a wall and having an outer surface. A capillary is within the outer sleeve and carries a fluid configured to communicate a pressure from a remote seal to a pressure transmitter. A space is provided about the capillary and is positioned between the capillary and the outer sleeve.

8 Claims, 6 Drawing Sheets

(56) References Cited

U.S. PATENT DOCUMENTS

| | | | |
|---|---|---|---|
| 5,655,560 A | 8/1997 | Kedar | |
| 5,763,787 A | 6/1998 | Gravel et al. | |
| 5,765,436 A * | 6/1998 | Wilda | G01L 19/0007 73/706 |
| 5,811,690 A | 9/1998 | Hershey | |
| 5,988,203 A | 11/1999 | Hutton | |
| 6,000,427 A | 12/1999 | Hutton | |
| 7,258,017 B1 | 8/2007 | Hedtke | |
| 7,412,893 B2 | 8/2008 | Hedtke | |
| 8,720,277 B2 | 5/2014 | Norberg et al. | |
| 9,274,018 B2 | 3/2016 | Miller et al. | |
| 2005/0082828 A1 | 4/2005 | Wicks et al. | |
| 2005/0126296 A1 | 6/2005 | Hedtke | |
| 2005/0210998 A1 | 9/2005 | Dimarco et al. | |
| 2005/0225035 A1 | 10/2005 | Sundet | |
| 2005/0247359 A1 | 11/2005 | Hiser | |
| 2007/0272027 A1 | 11/2007 | Hedtke | |
| 2008/0053255 A1 | 3/2008 | Furey et al. | |
| 2008/0245152 A1 | 10/2008 | Louwagie et al. | |
| 2010/0083768 A1* | 4/2010 | Hedtke | G01L 27/005 73/724 |
| 2013/0070889 A1 | 3/2013 | Iseda et al. | |

FOREIGN PATENT DOCUMENTS

| | | |
|---|---|---|
| GB | 1 022 816 | 3/1966 |
| GB | 2 299 841 | 10/1996 |

OTHER PUBLICATIONS

Notification of Transmittal of the International Search Report and the Written Opinion of the International Searching Authority for PCT/US2016/021660, dated Jun. 14, 2016.
Notification of Transmittal of the International Search Report and the Written Opinion of the International Searching Authority from PCT/US2013/037967, dated Oct. 23, 2013.
Invitation to Pay Fees from PCT/US2013/037967, dated Apr. 24, 2013.
Notification of Transmittal of the International Search Report and Written Opinion of the International Searching Authority from PCT/US2016/020563, dated Jun. 23, 2016.
Rolls-Royce Civil Nuclear: "Nuclear pressure transmitters Series 6000 Bibloc—Datasheet", Nov. 16, 2010 (Nov. 16, 2010), XP055279135, Retrieved from the Internet: URL:http://www.rolls-royce.com/~/media/Files/R/Rolls-Royce/documents/customers/nuclear-pressure-transmitters-brochure-tcm92-50336.pdf [retrieved on Jun. 9, 2016].
Kang Lin et al: "Pressure sensing line diagnostics in nuclear power plants 97 X Pressure sensing line diagnostics in nuclear power plants",, Jun. 26, 2012 (21012-06-26), XP0552979726, Retrieved from the Internet: URL:http://cdn.intechopen.com/pdfs/11567/InTech-Pressure_sensing_line_diagnostics_in_nuclear_power_plants.pdf [retrieved on Jun. 10, 2016].
H M Hashemian: "IAEA-CN-164-7S05 On-Line Monitoring and Calibration Techniques in Nuclear Power Plants",, Oct. 15, 2010 (Oct. 15, 2010), XP055279768, Retrieved from the Internet: URL:http://www-pub.iaea.org/mtcd/publications/pdf/p1500_cd_web/htm/pdf/topic7/7s05_h.hashemian.pdf [retrieved on Jun. 10, 2016].
Office Action from U.S. Appl. No. 14/672,714, dated Aug. 3, 2017.
Communication from European Patent Application No. 16713169.7, dated Nov. 10, 2017.

* cited by examiner

CAPILLARY CONNECTION THROUGH WALL PENETRATION

BACKGROUND

Embodiments described below relate to process field devices. In particular, the embodiments relate to connections between process field devices and remote seals.

In process environments, process transmitters or field devices are fluidically coupled to conduits carrying a process fluid. The process transmitters can be connected directly to the process fluid or can be connected through a remote seal that isolates the process transmitter from the process fluid using a diaphragm seal and a fill fluid. The diaphragm seal in the remote seal transmits the pressure of the process fluid to the fill fluid which is carried by a capillary tube to the process transmitter.

In nuclear power environments, the reactor and portions of the steam generation plant are located within a steel containment shell that is designed to contain radioactive steam up to a prescribed pressure limit in case one or more of the conduits associated with the nuclear reactor fails. In some systems, the steal containment shell is a 16-inch thick steel wall.

The discussion above is merely provided for general background information and is not intended to be used as an aid in determining the scope of the claimed subject matter. The claimed subject matter is not limited to implementations that solve any or all disadvantages noted in the background.

SUMMARY

A remote seal connection includes an outer sleeve, configured to be inserted through a penetration in a wall and having an outer surface. A capillary is within the outer sleeve and carries a fluid configured to communicate a pressure from a remote seal to a pressure transmitter. A space is provided about the capillary and is positioned between the capillary and the outer sleeve.

In accordance with a further embodiment, a method of installing a remote seal is provided that includes inserting a capillary connection through an opening in a wall and connecting the capillary connection to a remote seal on one side of the wall and a pressure transmitter on an opposite side of the wall. The capillary connection is then filled from the remote seal to the pressure transmitter with a fill fluid to form a filled system to thereby communicate a pressure applied to the remote seal to the pressure transmitter. The filled system's ability to communicate a pressure applied to the remote seal to the pressure transmitter is tested and after testing the capillary connection is secured to the wall.

In accordance with a further embodiment, an apparatus includes a remote process seal connected to a process conduit on a first side of a containment shell and a connector mounted through and secured to the containment shell. The connector carries a fill fluid fluidically connected to the remote seal. The apparatus further includes a pressures transmitter fluidically connected to the fill fluid of the connector on a second side of the containment shell to thereby receive a process pressure applied to the remote seal.

This Summary and the Abstract are provided to introduce a selection of concepts in a simplified form that are further described below in the Detailed Description. The Summary and the Abstract are not intended to identify key features or essential features of the claimed subject matter, nor are they intended to be used as an aid in determining the scope of the claimed subject matter.

DETAILED DESCRIPTION OF ILLUSTRATIVE EMBODIMENTS

Embodiments described below provide a capillary connector designed to pass through a containment shell such as for a nuclear facility and to connect a remote seal within the containment shell to a pressure transmitter located outside of the containment shell. The capillary connector is designed to be secured to the containment shell either through welding or a compression fitting. The connector has an inner capillary that is secured within an outer sleeve such that a space surrounds the inner capillary. This space prevents the fill fluid in the inner capillary from heating when the outer sleeve is welded to the containment shell or alternatively prevents pressure placed on the outer sleeve by a compression fitting from affecting the capillary.

Figure 1:
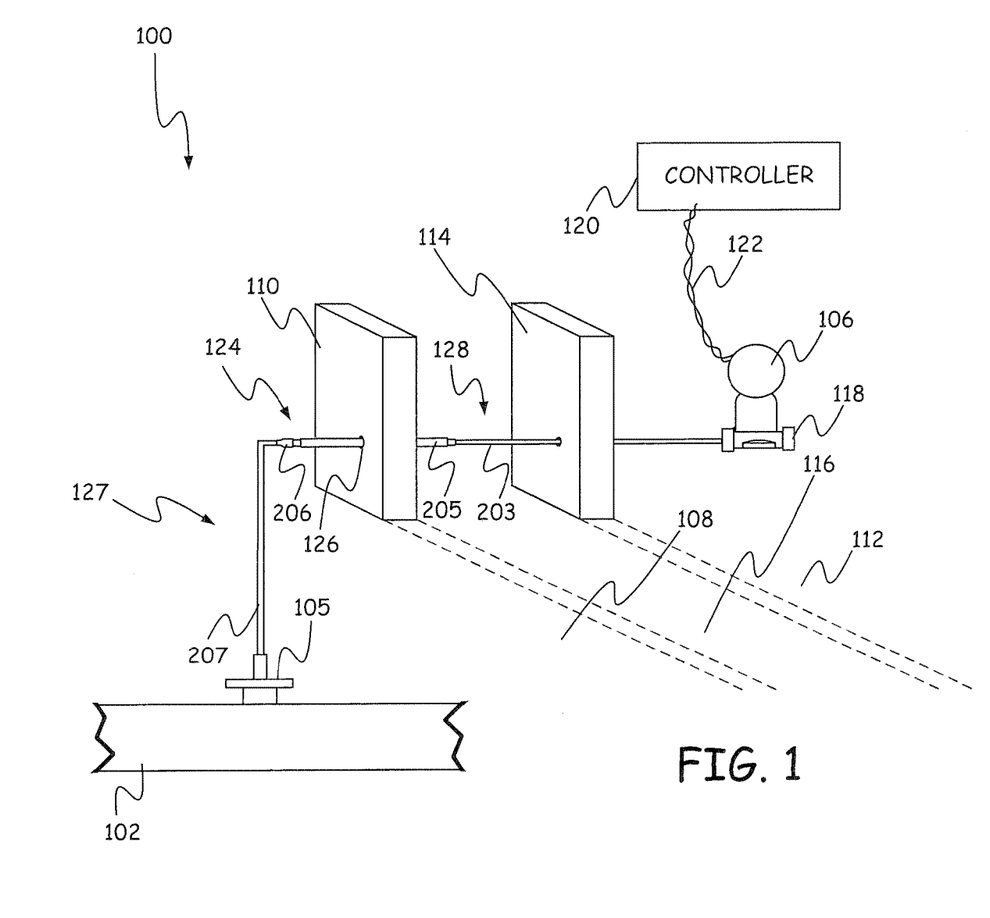
FIG. 1 is a diagram of a portion of a process environment.

FIG. 1 provides a diagram of a portion of a process environment 100 that includes a conduit 102 carrying a process fluid and a pressure transmitter 106 that measures a pressure in process conduit 102 through a remote seal 105. Remote seal 105 is connected to conduit 102 and includes an internal diaphragm that is in contact with the process fluid. Process conduit 102 and remote seal 105 are located in a containment area 108 that is enclosed by a containment shell 110. Containment shell 110 in many embodiments is a steel containment shell designed to contain contaminated steam up to a designated pressure level. Pressure transmitter 106 is located in an auxiliary building 112 that has an outer wall 114. Between containment shell 110 and outer wall 114 is a middle annulus 116.

Remote seal 105 is connected to pressure transmitter 106 by a capillary connector or remote seal connection 124 that has a first part 127 that is connected to the remote seal and a second part 128 that is connected to a flange 118. Pressure transmitter 106 is mounted on flange 118. First part 127 of capillary connector 124 includes a sheathed capillary 207 that extends from remote seal 105 to a receiver 206. Second part 128 of capillary connector 124 includes a sheathed capillary 203 that extends from flange 118 to a wall mount 205. An internal capillary within sheathed capillary 207 and receiver 206 is in fluid communication with the diaphragm seal of remote seal 105 and an internal capillary in sheathed capillary 203 and wall mount 205. The internal capillary of sheathed capillary 203 is in fluidic communication with an interior of flange 118 and sensing diaphragms in pressure transmitter 106. A fill fluid fills the internal spaces of capillary connector 124 and flange 118 from the diaphragm seal in remote seal 105 to the sensing diaphragm in pressure transmitter 106. As a result, pressure changes in the process fluid carried by conduit 102 are transmitted through the diaphragm seal in remote seal 105 to the fill fluid and from the fill fluid to the sensing diaphragm in pressure transmitter 106. The sensing diaphragm in pressure transmitter 106 senses the pressure in the fill fluid and pressure transmitter 106 communicates the pressure value to a controller 120 through a wired or wireless connection. In FIG. 1, a two wire process control loop 122 is provided for powering pressure transmitter 106 and for allowing communication between pressure transmitter 106 and controller 120.

To maintain the containment requirements of containment shell 110, wall mount 205 is welded to containment shell 110 or is attached to containment shell 110 through a compression fitting, both of which are described more fully below. Wall mount 205 includes an open space between an internal capillary within wall mount 205 and an external outer sleeve of wall mount 205. When wall mount 205 is welded to containment shell 110, this space helps prevent the fill fluid carried by the internal capillary from being heated. When wall mount 205 is attached to containment shell 110 with a compression fitting, this space helps prevent the internal capillary from being crushed or influenced by the pressure exerted by the compression fitting on the outer sleeve.

Figure 2:
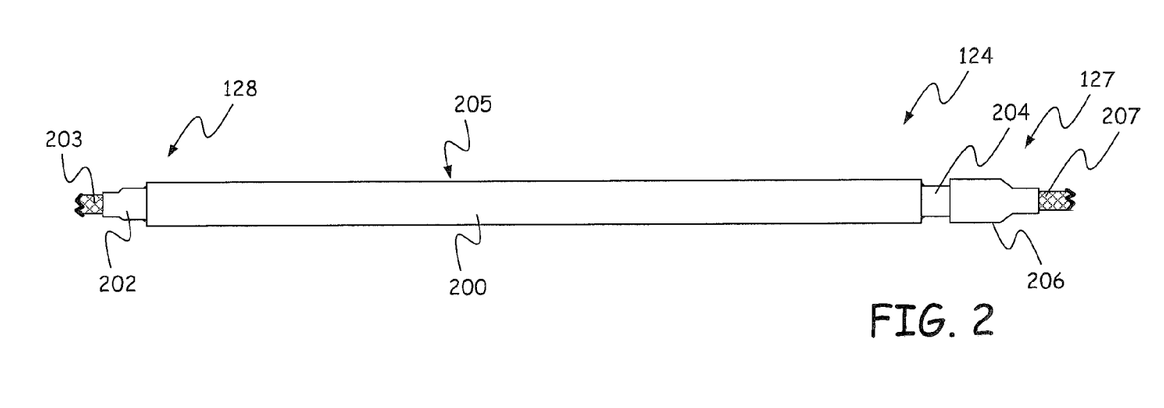
FIG. 2 is a side view of a capillary connector in accordance with one embodiment.

According to one embodiment, FIG. 2 provides a side view of receiver 206 and wall mount 205 of capillary connector 124. Wall mount 205 includes an outer sleeve 200, an inner sleeve 202, and a capillary fitting 204. Inner sleeve 202 receives and attaches to sheathed capillary 203 and receiver 206 receives and attaches to sheathed capillary 207.

Figure 3:
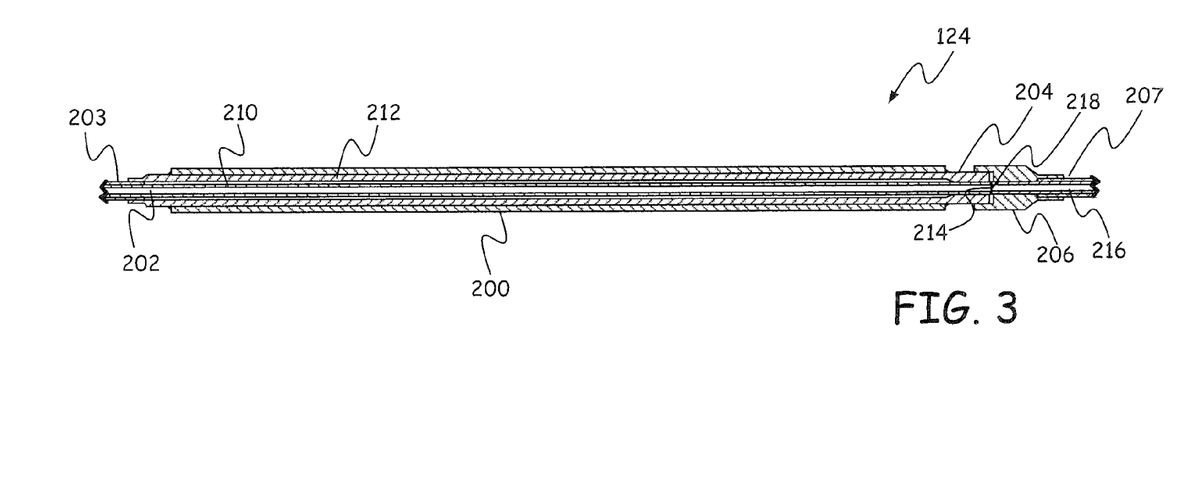
FIG. 3 is a sectional view of the capillary connector of FIG. 2.

FIG. 3 provides a sectional view of receiver 206 and wall mount 205 of capillary connector 124. As shown in FIG. 3, inner sleeve 202 extends from sheathed capillary 203 to capillary fitting 204 and defines capillary fitting 204. An internal capillary 210 of sheathed capillary 203 extends through inner sleeve 202 and terminates at an end 214 of capillary fitting 204. Internal capillary 210 is spaced apart from internal sleeve 202 by a space 212. An internal capillary 216 in sheathed capillary 207 extends through receiver 206 to an end 218.

Figure 4:
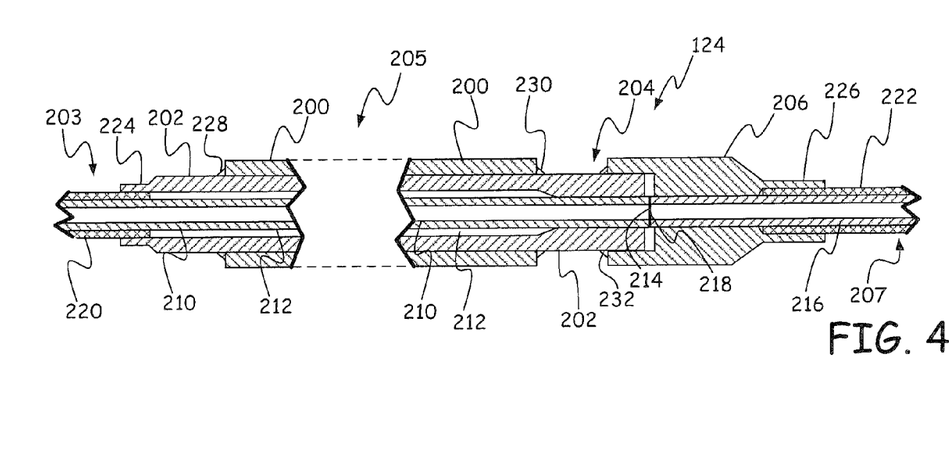
FIG. 4 is an enlarged view of the ends of the sectional view of FIG. 3.
Figure 5:
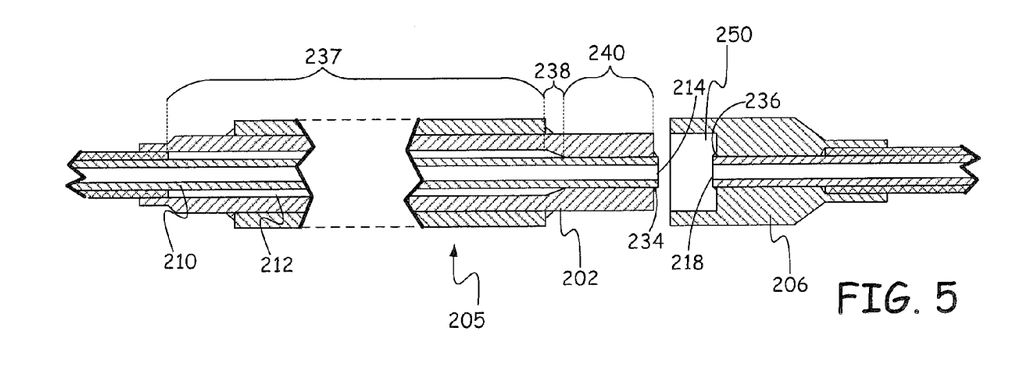
FIG. 5 is an enlarged view of the ends of FIG. 3 with the capillary fitting separated from the receiver.

FIG. 4 provides an expanded view of the ends of receiver 206 and wall mount 205 of capillary connector 124. FIG. 5 provides an expanded view of the ends of receiver 206 and wall mount 205 with receiver 206 and wall mount 205 disengaged from each other such that capillary connector 124 is in a separated state. In FIG. 4, sheathed capillary 203 is shown to include an outer sheath 220 and an internal capillary 210. Sheathed capillary 207 is shown to include outer sheath 222 and internal capillary 216. Outer sheath 220 of sheathed capillary 203 is received by neck 224 of inner sleeve 202 and is connected to neck 224 by a connector (not shown) such as a screw that passes through a hole (not shown) in neck 224. Similarly, outer sheath 222 is received by a neck 226 in receiver 206 and is connected to neck 226 by a connector passing through a hole (not shown) in neck 226.

According to this embodiment, outer sleeve 200 is a cylinder and extends concentrically around inner sleeve 202. The ends of outer sleeve 200 are welded to inner sleeve 202 at two concentric welds 228 and 230. The portion of inner sleeve 202 forming capillary fitting 204 is cylindrical and fits within a cylindrical opening 250 in receiver 206. Sides of capillary fitting 204 are welded to an end of receiver 206 at a concentric weld 232. Internal capillary 210 is welded to inner sleeve 202 by a concentric weld 234 at the end of capillary fitting 204. Internal capillary 216 is welded to receiver 206 by a concentric weld 236 near end 218 of internal capillary 216.

Inner sleeve 202 includes a spaced section 237 in which the inner sleeve is spaced from internal capillary 210 by space 212, a tapered section 238 in which the distance between the inner sleeve 202 and internal capillary 210 is reduced and a sealing portion 240 in which the inner sleeve is in contact with internal capillary 210. Spaced section 237 extends from an end of sheath 220, beneath all of outer sleeve 200, and ends at or after an end of outer sleeve 200. In spaced section 237, space 212 is concentric about internal capillary 210 and positioned between internal capillary 210 and outer sleeve 200. Tapered section 238 tapers the space before the capillary fitting 204.

As shown in FIG. 5, capillary connector 124 is a two-piece connector that facilitates easy installation. In particular, the two-piece construction allows outer sleeve 200 to be fed through penetration 126 in containment shell 110 from one side of the containment shell until capillary fitting 204 extends out of the other side of the containment shell. Capillary fitting 204 is then be inserted into receiver 206 and weld 232 is applied. As a result of the two-piece construction, sheathed capillaries 207 and 203 do not need to be fed through the containment shell. This simplifies the installation process especially when sheathed capillaries 207 and 203 are lengthy.

Figure 6:
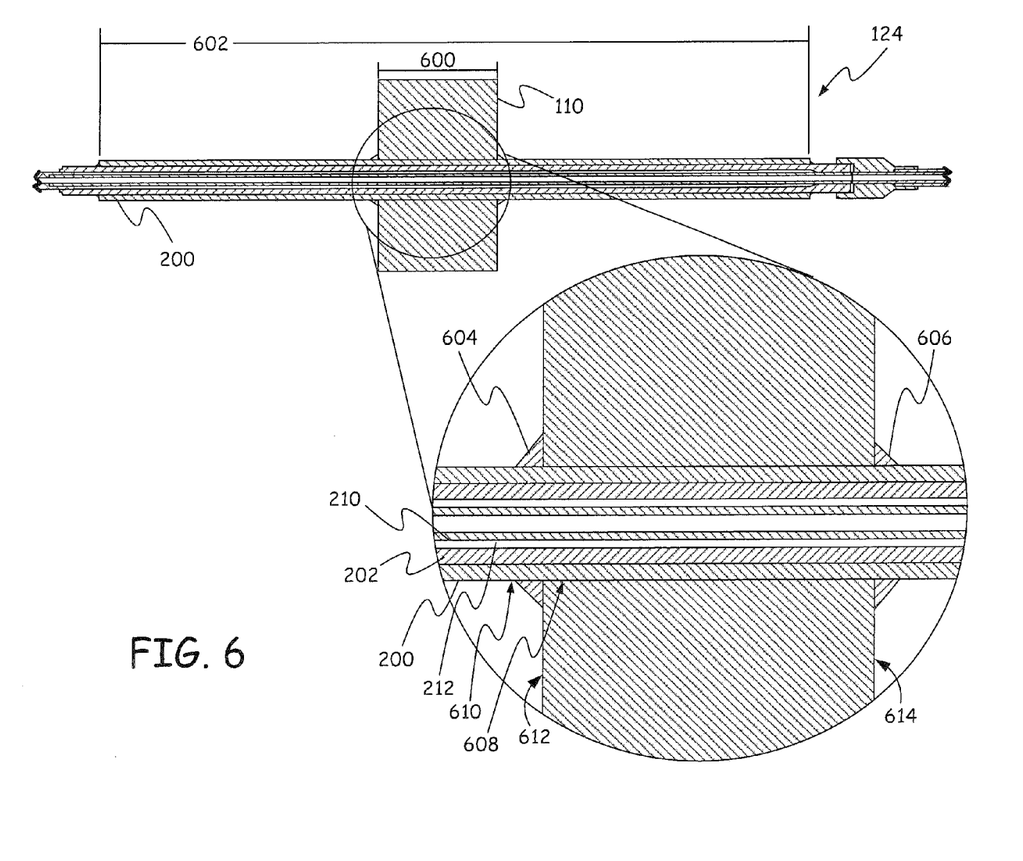
FIG. 6 provides a sectional view of the capillary connector secured to a wall in accordance with one embodiment.

FIG. 6 provides a sectional view of the capillary connector positioned within and secured to containment shell 110 in accordance with a first embodiment. In the embodiment shown in FIG. 6, containment shell 110 has a width 600 that is smaller than a length 602 of outer sleeve 200. However, those skilled in the art will recognized that in other embodiments, width 600 of the containment shell 110 may be any width that is less than width 602 of outer sleeve 200. As shown in the enlarged portion of FIG. 6, outer sleeve 200 passes through wall penetration or opening 608 in containment shell 110 and an outer surface 610 of outer sleeve 200 is sealed against outer wall surfaces 612 and 614 of containment shell 110 by concentric welds 604 and 606 that extend concentrically around outer surface 610 of outer sleeve 200. Space 212 in wall mount 205 shields internal capillary 210 from the heat used to form welds 604 and 606. In accordance with one embodiment, space 212 is large enough to prevent damage to internal capillary 210 when outer surface 610 is welded to wall surfaces 612 and 614. In accordance with further embodiments, space 212 is large enough to prevent internal capillary 210 from transmitting damaging levels of heat to a pressure transmitter connected to internal capillary 210 during the welding. In accordance with still other embodiments, space 212 is large enough to prevent damage to the fill fluid in internal capillary 210 when outer surface 610 is welded to wall surfaces 612 and 614.

Figure 7:
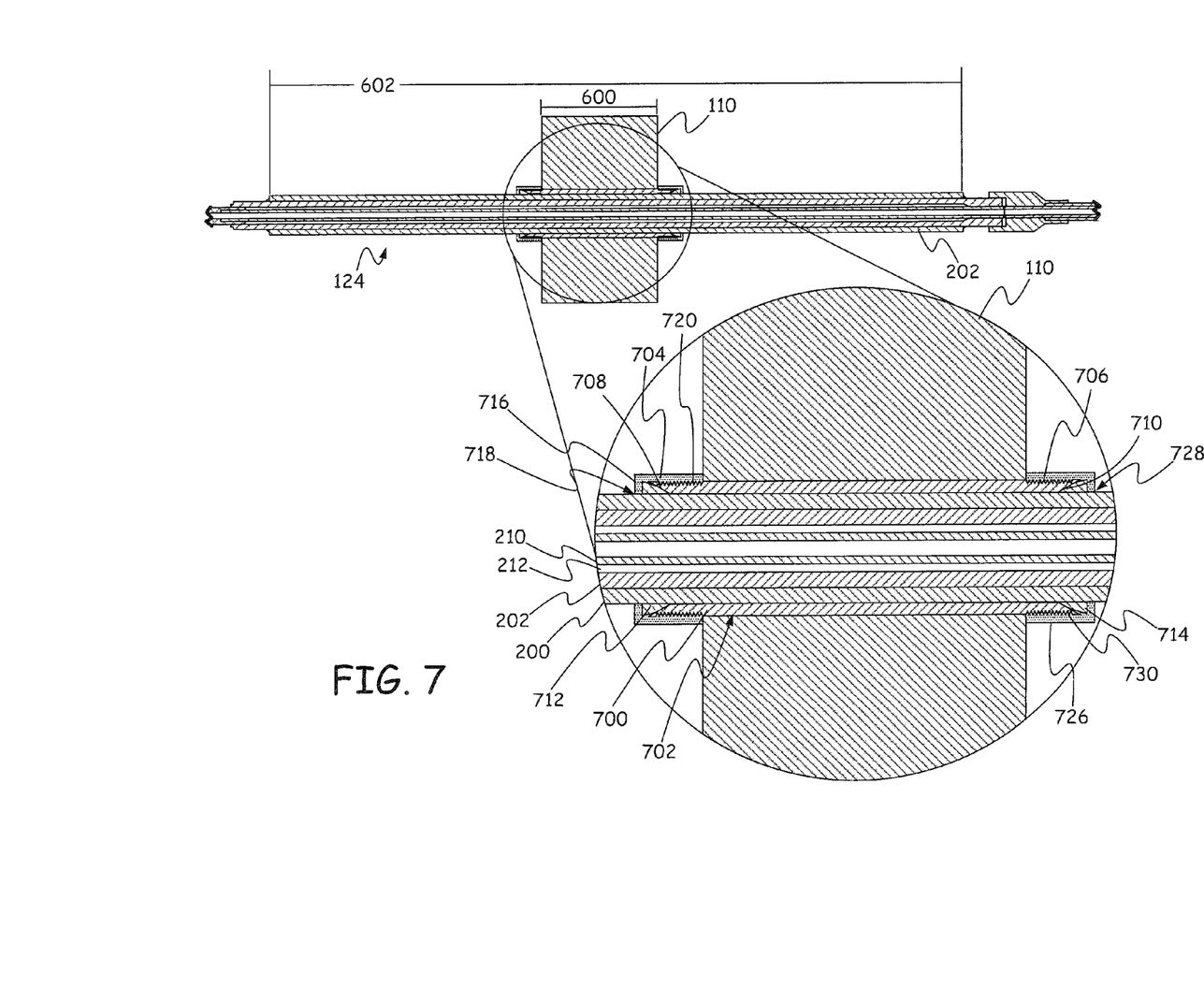
FIG. 7 shows a sectional view of the capillary connector secured to a wall in a second embodiment.

FIG. 7 shows a sectional view of capillary connector 124 inserted through and secured to containment shell 110 in accordance with a second embodiment. As shown in FIG. 7, the thickness of containment shell 600 is smaller than length 602 of outer sleeve 202. However, those skilled in the art will recognized that in other embodiments, width 600 of the containment shell 110 may be any width that is less than width 602 of outer sleeve 200.

In the embodiment shown in FIG. 7, capillary connector 124 is secured to containment shell 110 by a compression fitting. As shown in the expanded portion of FIG. 7, the compression fitting includes a cylindrical body 700 that is inserted through a penetration or opening 702 in containment shell 110 and is welded to containment shell 110. Capillary connector 124 is inserted within body 700 such that outer sleeve 200 is surrounded by and in contact with body 700. Body 700 includes threads 704 on a first end and threads 706 on a second end. Body 700 also includes a cylindrical inclined surface 708 on a first end and a cylindrical inclined surface 710 on a second end. An angled ring-shaped ferrule 712 mates with angled surface 708 and an angled ring-shaped ferrule 714 mates with angled surface 710.

A nut 716 has an opening 718 that receives capillary connector 124 and includes threads 720 that engage threads 704 on body 700. As nut 716 is tightened onto body 700, ferrule 712 is pressed between body 700 and outer sleeve 200 thereby forming a seal between body 700 and outer sleeve 200. Similarly, a nut 726 has an opening 728 that receives capillary connector 124 and includes threads 730 that engage threads 706 on body 700. As nut 728 is tightened onto body 700, ferrule 714 is pressed between body 700 and outer sleeve 200 thereby forming a second seal between body 700 and outer sleeve 200.

In FIG. 7, space 212 prevents the pressure applied by ferrules 712 and 714 to outer sleeve 200 from damaging or influencing capillary 210. Space 212 thereby prevents the securing of capillary connector 124 with a compression fitting from damaging capillary 210 or reducing the performance of capillary 210.

Figure 8:
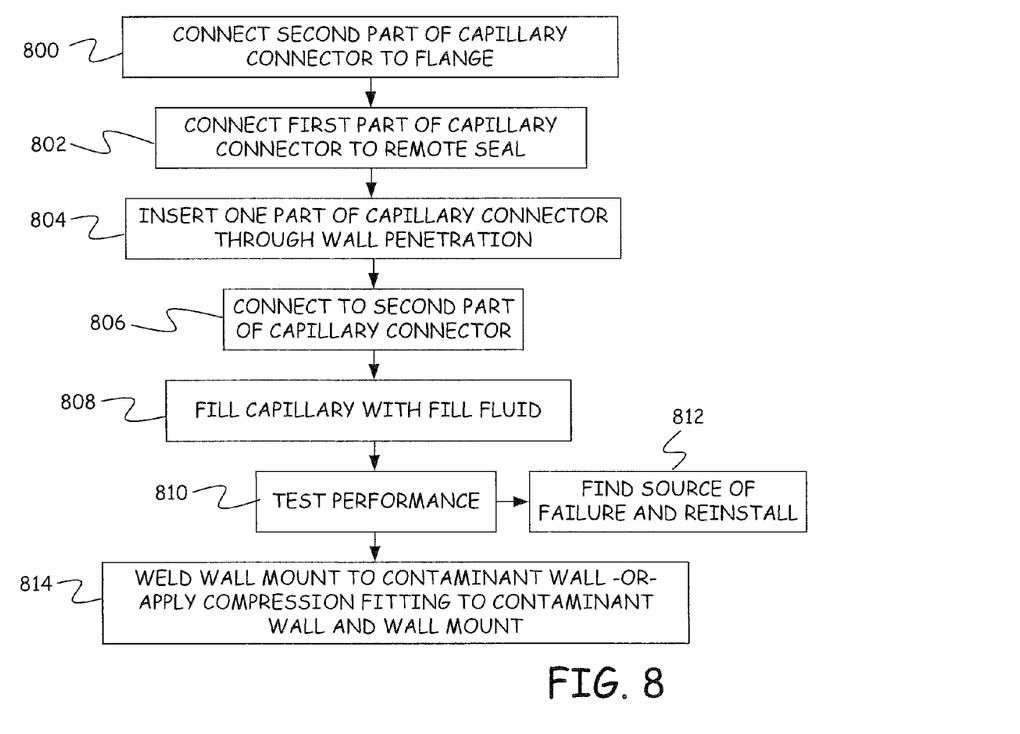
FIG. 8 provides a method of installing a capillary connector.

FIG. 8 provides a flow diagram of a method of connecting a pressure transmitter to a remote seal in accordance with one embodiment. In step 800 of FIG. 8, sheathed capillary 203 of second part 128 is connected to pressure transmitter 106 through flange 118. At step 802, sheathed capillary 207 of first part 127 is connected to remote seal 105. At step 804, wall mount 205 of capillary connector 124 is inserted through wall penetration 126. At step 806, receiver 206 of capillary connector 124 receives the capillary fitting 204 of wall mount 205 and the capillary fitting 204 is welded to receiver 206. In accordance with some embodiments, steps 804 and 806 are performed before steps 802 and 804.

At step 808, internal capillaries 210 and 216 are filled with fill fluid from remote seal 105 to pressure transmitter 106. At step 810, the performance of the system comprising the remote seal, the capillary connector and the pressure transmitter is tested to ensure that it is able to transmit pressure accurately from the remote seal to pressure transmitter 106. If the system fails the test, the source of the failure is detected at step 812 and one or more of the components are reinstalled. If the system passes the test at step 810, capillary connector 124 is welded to containment shell 110 or the compression fitting is used to secure capillary connector 124 to containment shell 110 at step 814. Thus, the capillary connector is only attached to the containment shell after it is determined that the system formed between the remote seal, the capillary connector and the pressure transmitter are operating properly. This reduces the amount of operations performed on the containment shell and thereby improves the integrity of the containment shell.

Although elements have been shown or described as separate embodiments above, portions of each embodiment may be combined with all or part of other embodiments described above.

Although the subject matter has been described in language specific to structural features and/or methodological acts, it is to be understood that the subject matter defined in the appended claims is not necessarily limited to the specific features or acts described above. Rather, the specific features and acts described above are disclosed as example forms for implementing the claims.

What is claimed is:

1. A method of installing a remote seal, the method comprising:
    inserting a first part of a capillary connection through an opening in a wall, the first part of the capillary connection comprising an outer sleeve, an inner sleeve and an inner capillary, where the outer sleeve extends around the inner sleeve and the inner sleeve extends around the inner capillary such that the inner capillary is separated from the inner sleeve along an entirety of a section of the inner sleeve that is within the outer sleeve and is sealed to the inner sleeve at a capillary fitting;
    connecting the capillary fitting to a receiver in a second part of the capillary connection;
    connecting the second part of the capillary connection to a remote seal on the same side of the wall as the capillary fitting;
    connecting the first part the capillary connection to a pressure transmitter on an opposite side of the wall from the capillary fitting;
    filling the capillary connection from the remote seal to the pressure transmitter with a fill fluid to form a filled system to thereby communicate a pressure applied to the remote seal to the pressure transmitter;
    testing the filled system's ability to communicate a pressure applied to the remote seal to the pressure transmitter; and
    securing the capillary connection to the wall after testing the filled system.

2. The method of claim 1 wherein securing the capillary connection to the wall comprises welding the outer sleeve of the capillary connection to the wall.

3. The method of claim 1 wherein securing the capillary connection to the wall comprises using a compression fitting.

4. The method of claim 1 wherein the space prevents the fill fluid from being damaged when the capillary connection is secured to the wall.

5. An apparatus comprising:
    a remote process seal connected to a process conduit on a first side of a containment shell;
    a connector mounted through and secured to the containment shell, the connector carrying a fill fluid fluidically connected to the remote seal, the connector comprising:
        a receiver;
        a first capillary extending from the remote process seal to the receiver;
        a wall mount secured to the containment shell and having a capillary fitting that is received by and welded to the receiver on the first side of the containment shell; and
        a second capillary that passes through the wall mount and the containment shell from the capillary fitting to the second side of the containment shell, wherein an exterior surface of the second capillary contacts an interior surface the capillary fitting at a sealing section; and
    a pressure transmitter fluidically connected to the second capillary of the connector on the second side of the containment shell to thereby receive a process pressure applied to the remote seal.

6. The apparatus of claim 5 wherein the wall mount comprises an outer sleeve, and a space surrounding the second capillary between the second capillary and the outer sleeve.

7. The apparatus of claim 6 wherein the connector further comprises an internal tapered section that tapers the space before the sealing section of the capillary fitting.

8. The apparatus of claim 6 wherein the connector is secured to the containment shell by being welded to the containment shell.

* * * * *

UNITED STATES PATENT AND TRADEMARK OFFICE
CERTIFICATE OF CORRECTION

PATENT NO. : 9,899,108 B2
APPLICATION NO. : 14/672681
DATED : February 20, 2018
INVENTOR(S) : Wiater Page 1 of 1

It is certified that error appears in the above-identified patent and that said Letters Patent is hereby corrected as shown below:

In the Claims

Column 6, Line 23, after "part", insert --of--.

Column 6, Line 62, after "surface", insert --of--.

Signed and Sealed this
Ninth Day of July, 2019

Andrei Iancu
*Director of the United States Patent and Trademark Office*